US005506082A

United States Patent [19]

Nguyen

[11] Patent Number: 5,506,082

[45] Date of Patent: Apr. 9, 1996

[54] CROSS-LINKED POLYVINYL BUTYRAL BINDER FOR ORGANIC PHOTOCONDUCTOR

[75] Inventor: Khe C. Nguyen, Milpitas, Calif.

[73] Assignee: Hewlett-Packard Company, Palo Alto, Calif.

[21] Appl. No.: 247,807

[22] Filed: May 23, 1994

Related U.S. Application Data

[62] Division of Ser. No. 84,377, Jun. 29, 1993, abandoned.

[51] Int. Cl.$^6$ .......................... G03G 15/04; G03G 15/00; C08F 8/00; C08G 63/48

[52] U.S. Cl. ................................ 430/66; 430/56; 430/64; 525/61

[58] Field of Search ................................ 430/96, 56, 57, 430/64, 66, 59; 525/61

[56] References Cited

U.S. PATENT DOCUMENTS

| | | | |
|---|---|---|---|
| 4,355,886 | 10/1982 | Perez et al. | 430/108 X |
| 4,499,236 | 2/1985 | Hermann et al. | 525/61 X |
| 5,087,540 | 2/1992 | Murakami et al. | 430/58 |

FOREIGN PATENT DOCUMENTS

| | | | |
|---|---|---|---|
| 461075 | 11/1949 | Canada | 525/61 |
| 2251857 | 10/1990 | Japan | 430/96 |
| 2256057 | 10/1990 | Japan | 430/96 |

*Primary Examiner*—George F. Lesmes
*Assistant Examiner*—Bernard P. Codd

[57] ABSTRACT

The invention is a self-cross-linked polyvinyl butyral (PVB) binder for organic photoconductors (OPC's). The non-cross-linked form of the binder is available from Monsanto Co. in the U.S.A. as Butvar™, and from Sekisui Chemical Co. in Japan as Slek™. It was discovered that the PVB may be self-cross-linked by subjecting it to a thermal cure at between about 150°–300° C. for about 2 hours. Other ways of cross-linking, for example, e-beam, UV or X-ray radiation, may achieve results similar to those obtained with heat. No cross-linker, nor cross-linkable copolymer nor catalyst is required to accomplish the cross-linking. After self-cross-linking, the PVB has good mechanical durability and good anti-solvent characteristics. In addition, the self-cross-linked PVB's glass transition temperature ($T_g$) increases from about 65° C. to about 170° C. Also, when conventional photoconductor pigments are dispersed in the self-cross-linked PVB, they are well dispersed, and the resulting OPC's have good charge acceptance, low dark decay, and in general, good photodischarge characteristics. Also, OPC's with the self-cross-linked PVB exhibited improved adhesion, so multi-layered OPC's made according to this invention will have improved inter-layer bonding and longer economic lives.

5 Claims, 9 Drawing Sheets

CROSS-LINKED POLYVINYL BUTYRAL BINDER FOR ORGANIC PHOTOCONDUCTOR

CROSS-REFERENCE TO RELATED APPLICATION

This application is a division of my prior, application Ser. No. 08/084,377, filed Jun. 29, 1993 and entitled "Cross-Linked Polyvinyl Butyral Binder for Organic Phototconductor", now abandoned, the disclosure of which is hereby incorporated by reference thereto.

FIELD OF THE INVENTION

This invention relates generally to photoconductors for electrophotography. The invention is a positive charging, organic photoconductor material with good speed and stability, as well as improved adhesion for multi-layer photoconductors for dry and liquid toner electrophotography.

BACKGROUND OF THE INVENTION

In electrophotography, a latent image is created on the surface of photoconducting material by selectively exposing areas of the charged surface to light. A difference in electrostatic charge density is created between the areas on the surface exposed and unexposed to light. The visible image is developed by electrostatic toners containing pigment components and thermoplastic components. The toners are selectively attracted to the photoconductor surface either exposed or unexposed to light, depending on the relative electrostatic charges of the photoconductor surface, development electrode and the toner. The photoconductor may be either positively or negatively charged, and the toner system similarly may contain negatively or positively charged particles. For laser printers, the preferred embodiment is that the photoconductor and toner have the same polarity, but different levels of charge.

A sheet of paper or intermediate transfer medium is then given an electrostatic charge opposite that of the toner and passed close to the photoconductor surface, pulling the toner from the photoconductor surface onto the paper or intermediate medium, still in the pattern of the image developed from the photoconductor surface. A set of fuser rollers fixes the toner to the paper, subsequent to direct transfer, or indirect transfer when using an intermediate transfer medium, producing the printed image.

The important photoconductor surface, therefore, has been the subject of much research and development in the electrophotography art. A large number of photoconductor materials have been disclosed as being suitable for the electrophotographic photoconductor surface. For example, inorganic compounds such as amorphous silicon (Si), arsenic selenite ($As_2Se_3$), cadmium sulfide (CdS), selenium (Se), titanium oxide ($TiO_2$) and zinc oxide (ZnO) function as photoconductors. However, these inorganic materials do not satisfy modern requirements in the electrophotography art of low production costs, high-speed response to laser diode or other light-emitting-diode (LED), and safety from non-toxicity.

Therefore, recent progress in the electrophotography art with the photoconductor surface has been made with organic materials as organic photoconductors (OPC's). Typically, the OPC's in the current market are of the negative-charging type with a thin charge generation material layer, usually less than about 1 micron (μm) thick, beneath a thicker charge transport material layer deposited on top of the charge generation layer. The negative-charging OPC's perform well for xerographic copiers and printers in the following applications:

a. Low end (4–10 copies per minute) and high end (more than 50 copies per minute) xerographic systems using dry powder developers of one or two colors, or using liquid developers for black and white copies only; and, b. High image quality (above 1800 DPI) color proofing, lithographic plate printing and master xerographic printing systems with life expectancies of less than 100 cycles.

However, prior art negative-charging OPC's also have several drawbacks, namely:

1. Large amounts of ozone are generated in the negative corona charging process, creating environmental concerns. This problem has been addressed by installing ozone absorbers like activated carbon filters, and by using contact negative charging instead of corona charging. These ozone remediation approaches, however, have drawbacks of their own and are not attractive commercial solutions.

2. Negative corona charging generally results in less charge pattern uniformity compared to positive corona charging. Lower charge pattern uniformity in turn results in more noise and less definition in the final image.

3. In small particle toner processes, including fine dry powder and liquid toner processes, designers have been able to develop more charge stability in positively charged toners than in negatively charged toners. Therefore, positive charging OPC's ((+)OPC's) are preferred for a discharged area developed image as in laser printers.

Specific morphologies of phthalocyanine pigment powder have been known to exhibit excellent photoconductivity. These phthalocyanine pigments have been used as a mixture in polymeric binder matrices in electrophotographic photoconductors, deposited on a conductive substrate. In these phthalocyanine/binder photoconductors, the photo-generation of charge and the charge transport occur in the particles of the phthalocyanine pigment while the binder is inert. Therefore, the photoconductor may be made of a single layer of phthalocyanine/binder. These single-layer photoconductors are known to be very good positive charging OPC's due to the hole (positive charge) transportability of the phthalocyanine pigment.

In these single-layer photoconductors, then, there is no need to add charge transport molecules, nor to have a separate charge transport layer. The phthalocyanine pigment content may be in the range of about 10–30 wt. %, high enough to perform both charge generation and charge transport functions, with the binder content being in the range of about 90–70 wt. %. The single photoconductor layer is usually more than about 3 μm thick in order to achieve the required charge acceptance and resulting image contrast.

Therefore, it is a first object of this invention to provide a (+)OPC which exhibits stable electrical properties, including charge acceptance, dark decay and photodischarge, in a high cycle, high severity electrophotographic process. Modern digital imaging systems, wherein the writing head is LED array or laser diode, have very high light intensities (about 100 ergs/$cm^2$) over very short exposure time spans (less than 50 nano-seconds), resulting in severe conditions for the OPC compared to optical input copiers with light intensities between about 10–30 ergs/$cm^2$ and exposure times between about several hundred microseconds to milliseconds.

Unfortunately, there is no product on the market today which provides such stable electrical properties. This is because the (+)OPC exhibits instability when it is frequently exposed to the corona charger and the intense light source in the electrophotographic process. I have discovered this instability to be more pronounced at the strong absorption, high light intensity, short exposure time conditions required for the laser printing process. The instability of the photoconductor is exhibited in the significant increase of its dark decay characteristic after a relatively small number of repeat cycles of laser printing. Also, the instability is exhibited in the decrease in surface potential after repeat cycles. These instabilities cause deleterious changes in image contrast, and raise the issue of the reliability of image quality.

Preferably, desirable electrophotographic performance may be defined as high charge acceptance of about 60–100 V/μm, low dark decay of less than about 5 V/sec., and photodischarge of at least 90% of surface charge with the laser diode beam of 780 nm or 830 nm frequency, through the optical system including beam scanner and focus lenses, synchronized at 0.05 micro seconds for each beam.

When conventional binders for the phthalocyanine pigment, such as acrylic resins, phenoxy resins, vinyl polymers including polyvinyl acetate and polyvinyl butyral, polystyrene, polyesters, polyamides, polyimides, polycarbonates, methyl methacrylate, polysulfones, polyarylates, diallyl phthalate resins, polyethylenes and halogenated polymers, including polyvinyl chloride, polyfluorocarbon, etc., are used, acceptable charge acceptance and photodischarge are obtained. However, among these polymers which result in good performance for charge acceptance and photodischarge, none of them exhibit the desirable stability under the severe LED array or laser diode exposure conditions described above.

The conventional OPC's are presently made with thermoplastic binders which exhibit poor wear resistance, especially in high-speed, high-cycle applications using two-component developers, including magnetic carrier and toner, and in applications using tough cleaning blade materials such as polyurethane. Generally, an OPC with a mechanically worn surface exhibits diminished electrophotographic properties, such as low charge acceptance, high dark decay rate, low speed and low contrast.

A second object of this invention is to provide an OPC with superior durability from mechanical strength, solvent resistance and thermal stability. The OPC must be mechanically strong in order to ensure wear resistance in high cycle applications. It must be solvent resistant in order to prevent it from being changed or lost in the liquid toner applications. It must be thermally stable in order to ensure predictable and repeatable performance at and after different operating temperatures, especially the elevated temperatures, typically about 70° C., for modern laser printers.

Also, the conventional thermoplastic binders exhibit higher solubility in the solvents used in liquid toner applications. For example, in the wet environment required to achieve very high resolution above 1200 DPI associated with high-end applications, the liquid carrier tends to partially dissolve the OPC's binder, causing diminished resolution. Also, in aqueous inking applications, water has an adverse effect on the conductivity of OPC's made with these conventional binders, which effect is aggravated by higher temperatures.

Also, the conventional thermoplastic binders exhibit high thermal degradation in the electrical properties important for electrophotography, reflected in decreased charge acceptance, increased dark decay rate and reduced contrast potential.

A third object of this invention is to provide a cross-linked binder for an OPC without having to provide also, besides the binder material, a cross-linker material, or a cross-linkable copolymer material, or a cross-linking catalyst, which may affect the life of the OPC. This way, the binder may remain free of these additional materials.

In order to satisfy these mechanical, chemical and thermal durability requirements for the OPC, then, a unique cross-linkable polymeric binder material must be obtained.

Generally, cross-linking polymers such as epoxy, phenolic resin, polyurethane, etc., has been known. For reinforced fiber plastics in the electronics packaging industry, for example, significant improvement in the glass transition temperature ($T_g$) has been obtained by cross-linking with heat, radiation (e-beam, UV, X-ray, etc.), and/or moisture. However, for OPC applications, general cross-linking principals cannot be freely practiced because photoconductor components such as charge generation molecules (dye, pigment, etc.) and charge transport molecules are vulnerable to the heat, high-energy radiation and moisture used in the conventional cross-linking processes. Therefore, after cross-linking, these molecules may not exist in the cross-linked product in forms in which they are functional as charge generation or charge transport molecules. This is why prior attempts at cross-linking photoconductor binders have not been successful, whether for hole transport molecules such as hydrozones, arylamines, pyrazolines or triphenylmethanes, or for electron transport molecules, such as diphenyl sulfones, fluorenones, quinones, or whether the photoconductor is in a single or a multiple layer. All these attempts exhibit poor compatibility of the transport molecules in the cross-linked binders, resulting in undesirable photodischarge characteristics.

A fourth object of this invention is to provide a cross-linked binder for an OPC with superior adhesion to other polymer layers. This way, multi-layered OPC's may be made which do not separate too easily and come apart at the interface between the layers.

Among the conventional thermoplastic binders, polyvinyl butyral (PVB), is observed as the best binder for good dispersion and good film forming for many classes of photoconductive pigments in the applications of photoconductor technology. Still, the use of the thermoplastic PVB for phthalocyanine pigment in the single layer (+)OPC, doesn't show superior performance compared to the other conventional thermoplastic binders for photoresponse to the 780 nm laser diode, electrical stability, and environmental stability to heat and liquid toners. Also, the use of thermoplastic PVB as binder for the charge generation layer in the dual layer photoconductor, in general, exhibits poor adhesion due to the cohesive failure effect associated with the incompatibility between the binder of the charge generation layer (CGL) and the binder, usually phenylpolymers such as polycarbonate, polyester, polyimide, polystyrene, etc., of the charge transport layer (CTL).

This invention aims at a preparation method for such kinds of infrared-sensitive photoconductors using cross-linkable binder for long-life applications.

SUMMARY OF THE INVENTION

The invention is a self-cross-linked polyvinyl butyral (PVB) binder for OPC's. The non-cross-linked form of the binder is available from Monsanto Co. in the U.S.A. as Butvar™, and from Sekisui Chemical Co. in Japan as Slek™. I discovered that the PVB may be self-cross-linked by subjecting it to just a thermal cure at between about 150°–300° C. for about 2 hours. I think other ways of cross-linking, for example, e-beam, UV or X-ray radiation, will achieve results similar to those I obtained with heat. No cross-linker, nor cross-linkable copolymer nor catalyst is required to accomplish the cross-linking.

After self-cross-linking, the PVB has good mechanical durability and good anti-solvent characteristics. In addition, the self-cross-linked PVB's glass transition temperature ($T_g$) increases from about 65° C. to about 170° C. Also, when conventional photoconductor pigments are dispersed in the self-cross-linked PVB, they are well dispersed, and the resulting OPC's have good charge acceptance, low dark decay, and in general, good photodischarge characteristics.

Especially, for the applications towards (+) single layer OPC using x-metal free phthalocyanine (x-$H_2Pc$) pigment, it is observed that there is a significant improvement of the photoresponse with 780 nm laser exposure when the device is subjected to the self-cross-linking condition of the binder by a thermal curing process between 150° C. and 300° C. In this case, the x-$H_2Pc$-PVB system was confirmed not to indicate a change in the morphology of the pigment. The increased photoresponse in the cross-linked x-$H_2Pc$-PVB is not well understood. However, it is assumed that it could be related to the reduction of the highly reactive hydroxy (—OH) group in the PVB after the cross-linking process. Generally speaking, the photo-physical process in the metal free phthalocyanine pigment is strongly dependent on the behavior of the lone pair of the N atom. The interaction (for example, hydrogen bonding) between the free —OH group of the thermoplastic PVB and these N atoms may restrict the generation of free carrier under photo-excitation process or thermal excitation process. I also discovered that the control of the —OH content in the device, for example by changing the baking conditions (baking temperature and baking time) is capable of controlling the balance between the photoresponse and dark decay, i.e., to achieve highest photoresponse with the lowest dark decay.

The increased photoresponse in the (+) single layer OPC using x-$H_2Pc$/self cross-linked PVB is also observed in the (−) dual layer OPC structure using self-cross-linked charge generator layer (CGL). This layer also indicates a significant improvement of the device stability with repeat cycles and environmental changes of heat and humidity.

Also, OPC's with the self-cross-linked PVB exhibited improved adhesion, so multi-layered OPC's made according to this invention will have improved inter-layer bonding and longer economic lives.

DESCRIPTION OF THE DRAWINGS

FIGS. 1–4 are schematic, cross-sectional views of several embodiments of the invention, wherein:

1—conductive substrate

2—photoconductor layer

2A—charge generation layer

2B—charge transport layer

3—charge blocking layer

4—charge injection barrier layer

5—release layer.

Figure 1:
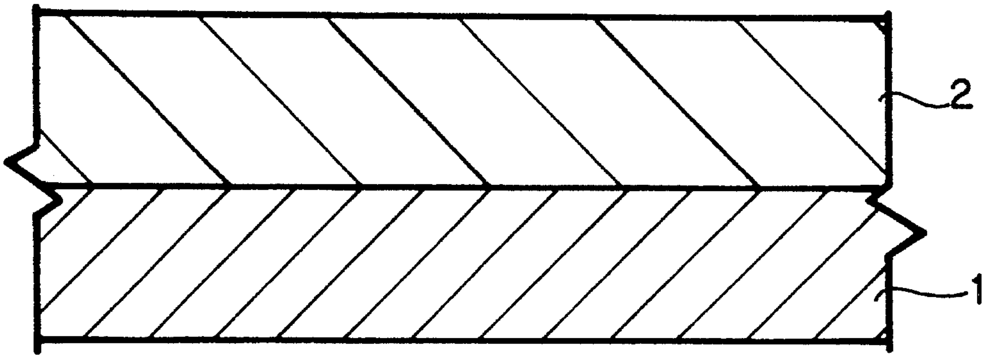
Figure 2:
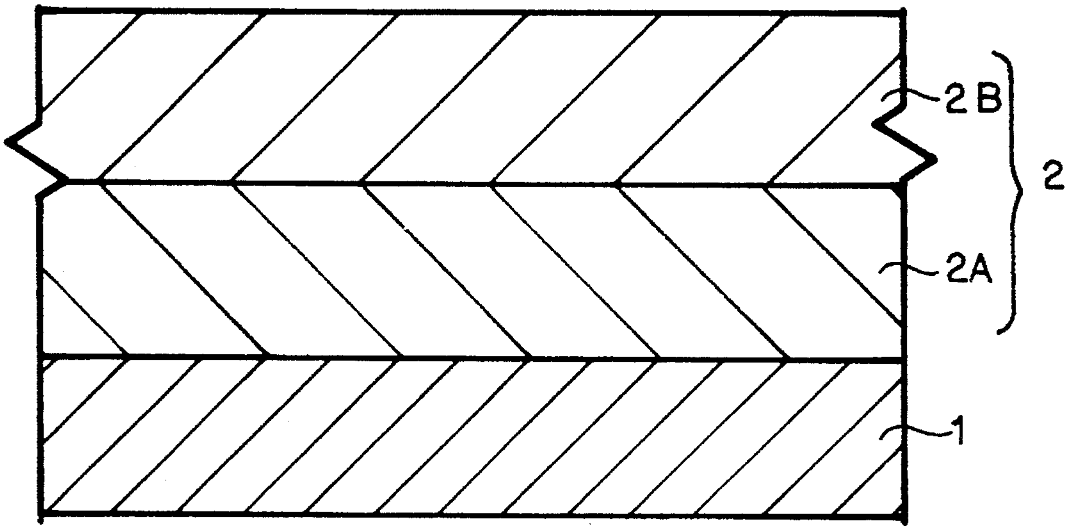
Figure 3:
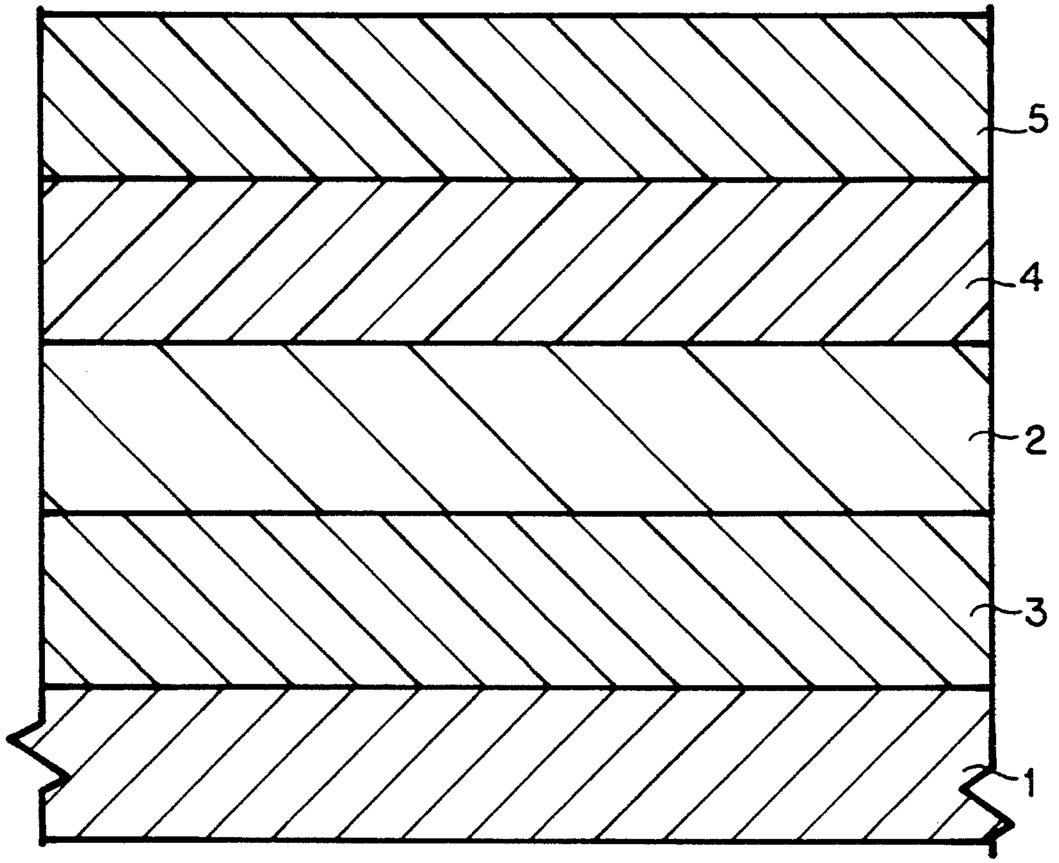
Figure 4:
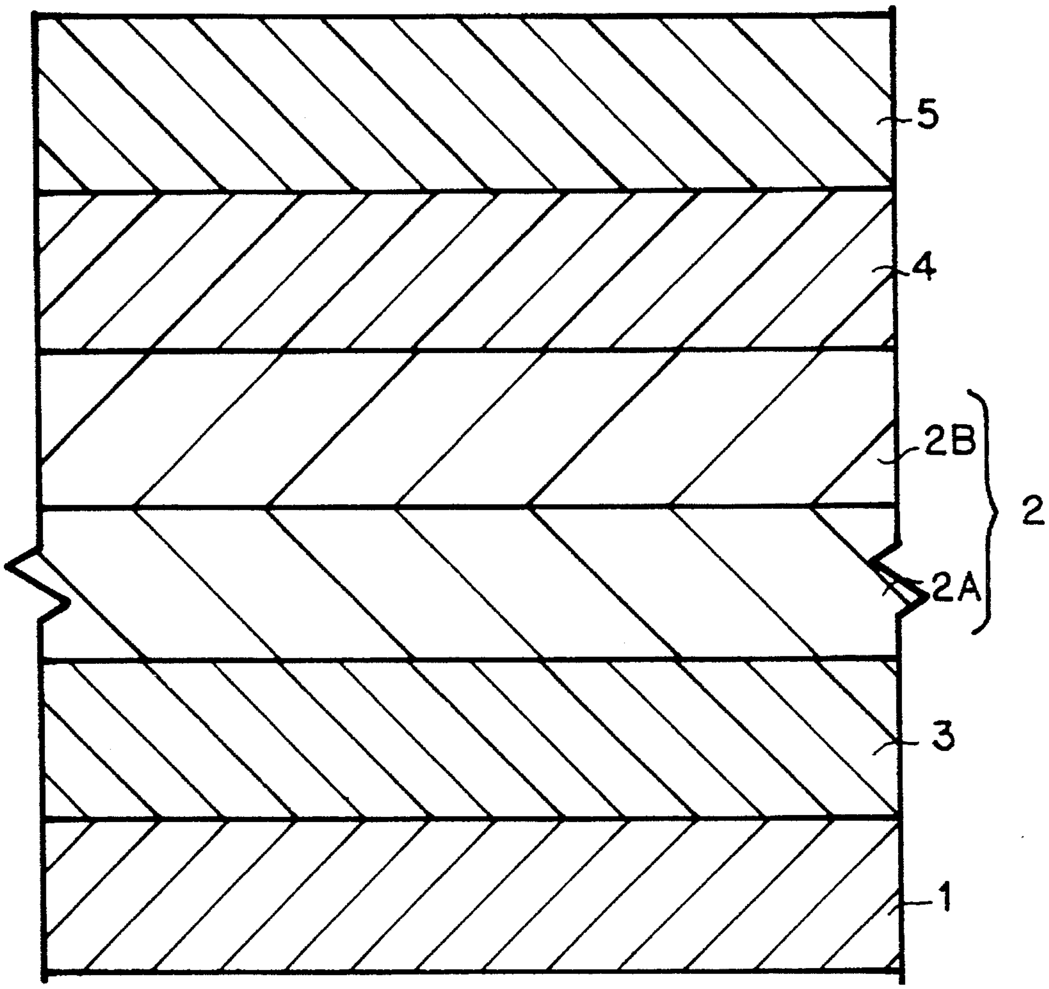
Figure 5A:
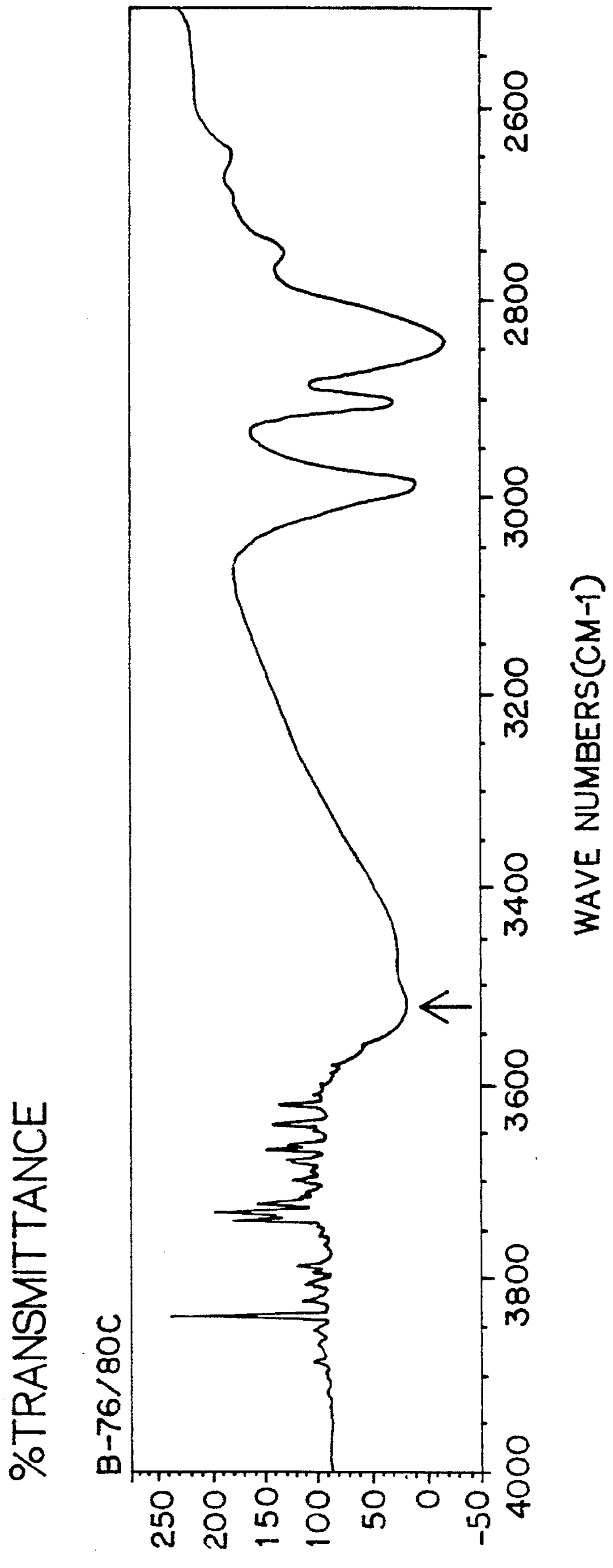
Figure 5B:
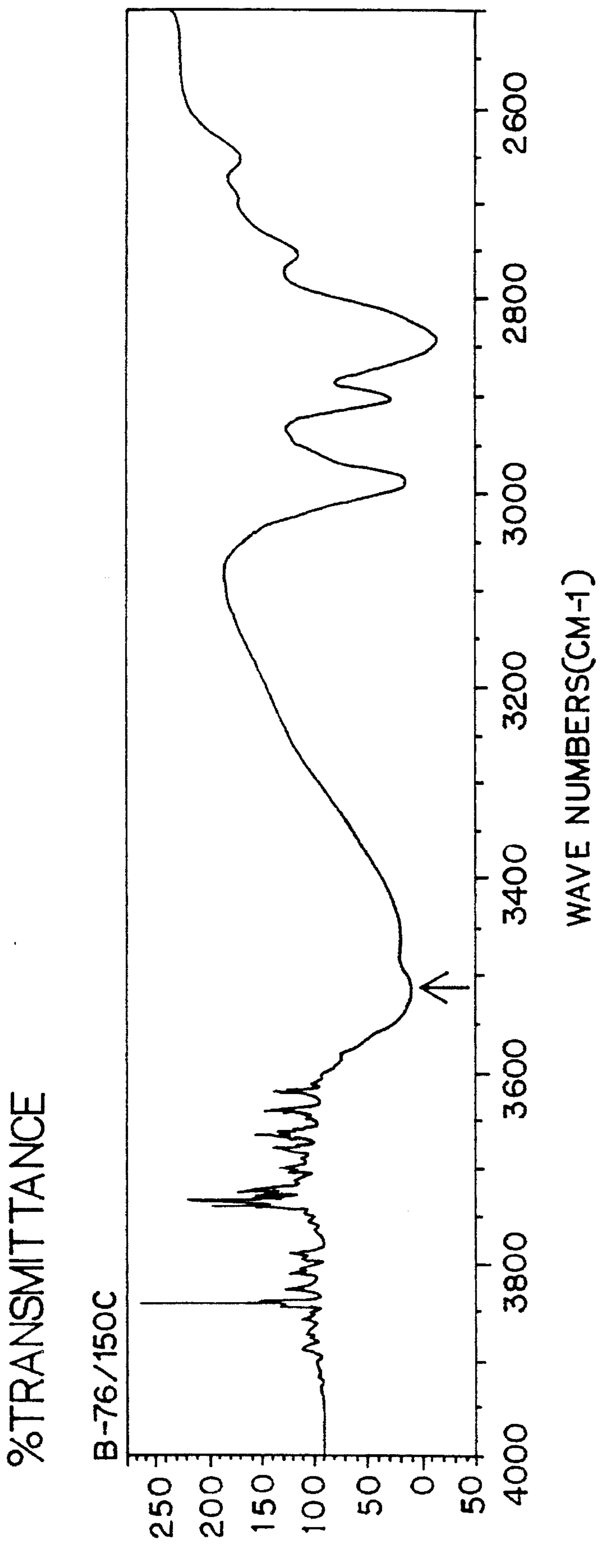
Figure 5C:
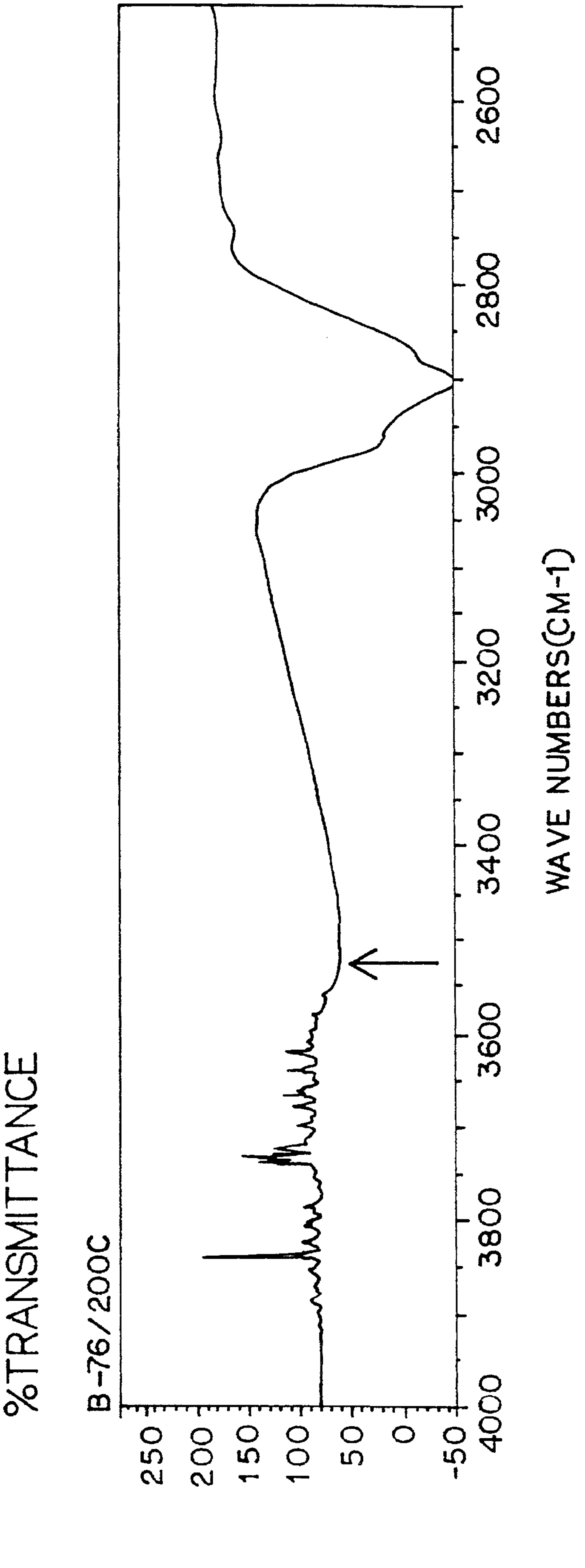
Figure 6A:
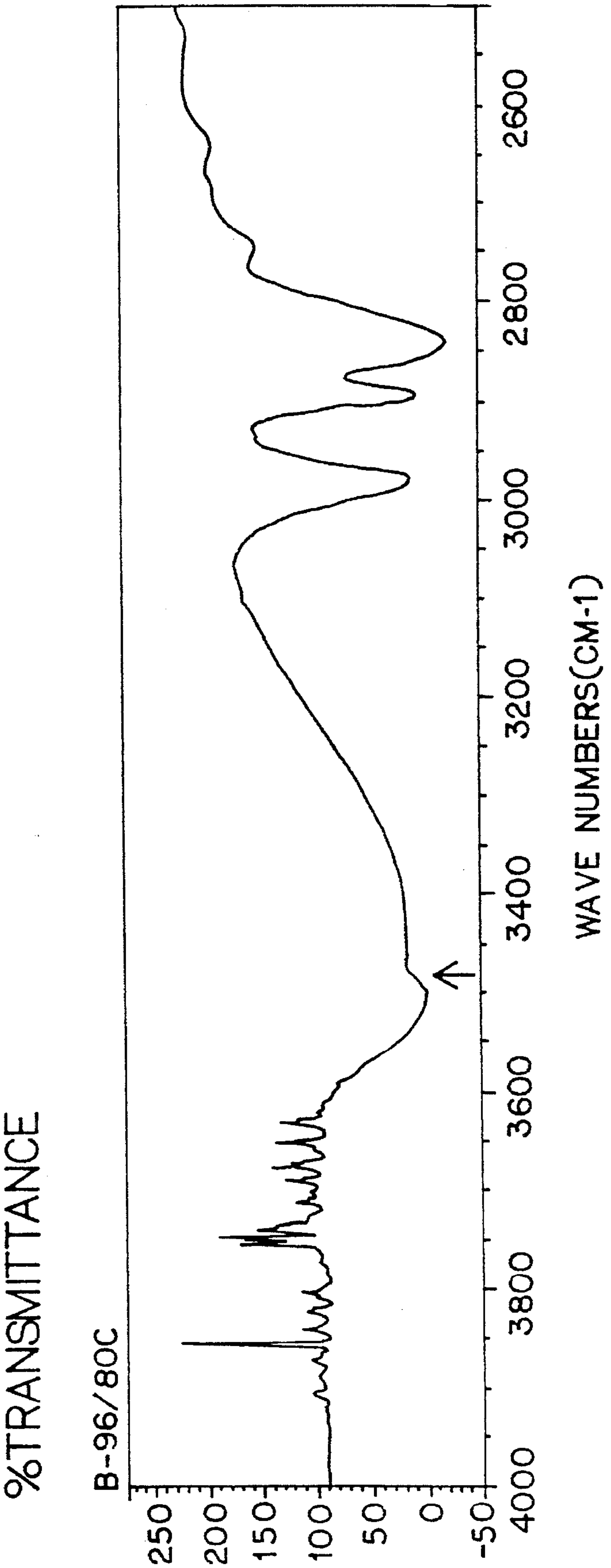
Figure 6B:
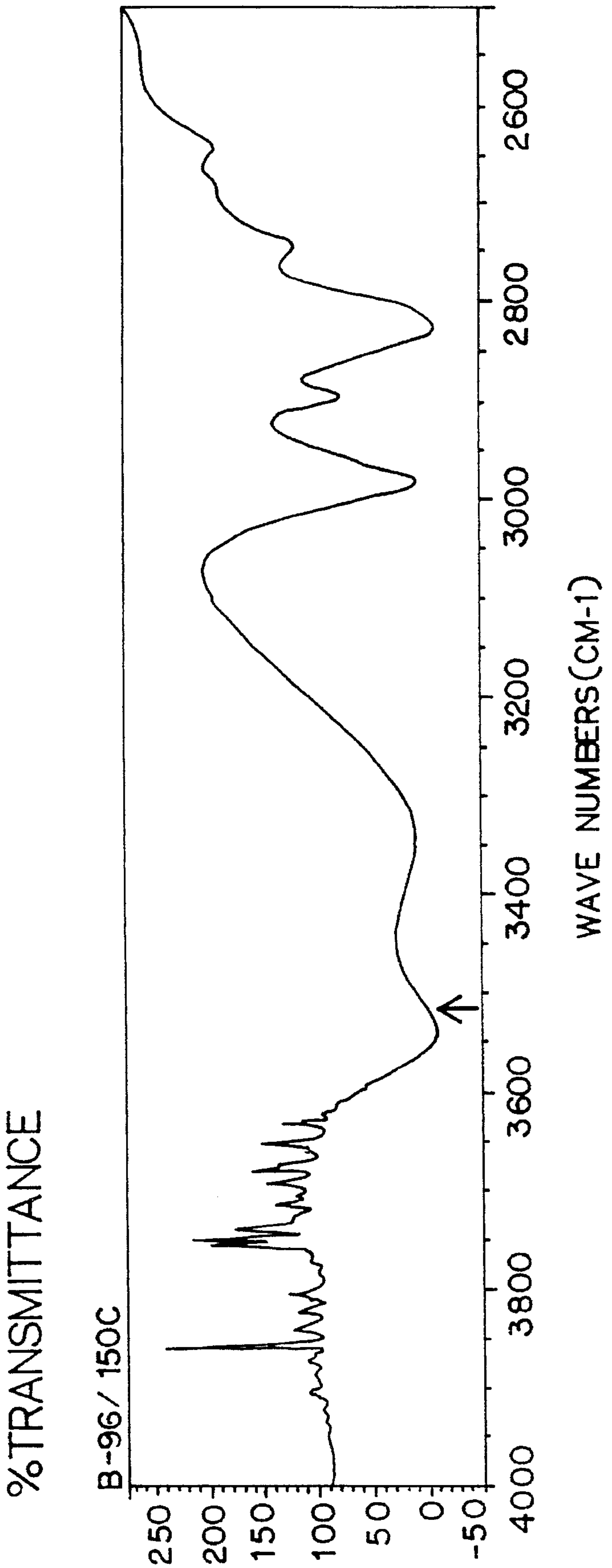
Figure 6C:
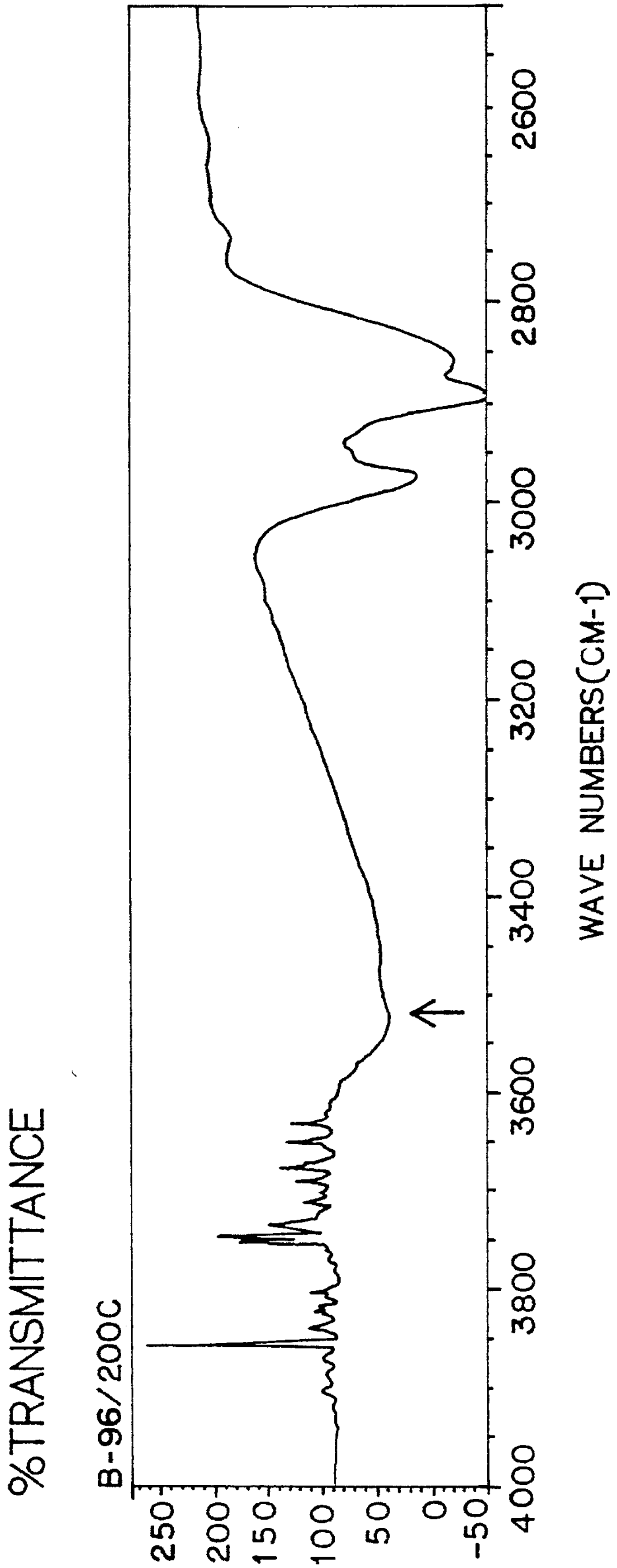

FIGS. 5 and 6 illustrate the Ft-IR spectrum of two different kinds of polyvinyl butyral, Butvar™ B-76 and B-98 (Monsanto Chemical) baked at different temperatures.

DETAILED DESCRIPTION OF THE INVENTION

Referring to the Figures, there are depicted several schematic, cross-sectional views of several embodiments of the invention. An OPC is provided with a conductive substrate 1, and a photoconductor layer 2. Photoconductor 2 may contain a separate charge generation layer **2*a*, and a separate charge transport layer 2*b*. An optional charge blocking layer 3 may be placed between the substrate 1 and the photoconductor 2. Also, optional charge injection barrier layer 4 and release layer 5 may be placed in order above photoconductor layer 2**. Also, other layers commonly used in OPC's may be used, such as, for example, anti-curl layers, overcoating layers, and the like.

The conductive substrate 1 may be opaque or substantially transparent and may comprise numerous suitable materials having the required mechanical properties. The substrate may further be homogeneous or layered itself, and, in the latter case, provided with an electrically conductive surface. Accordingly, the substrate may comprise a layer of an electrically non-conductive material and a layer of conductive material, including inorganic or organic compositions. As electrically non-conducting materials, there may be employed various resins known for this purpose including polyesters, polycarbonates, polyamides, polyimides, polyurethanes, and the like. The electrically insulating or conductive substrate may be rigid, flexible, and may have any number of different configurations such as, for example, a cylinder, a sheet, a scroll, an endless flexible belt, and the like. The electrically conductive part of the substrate may be an electrically conductive metal layer which may be formed, for example, on the insulating part of the substrate by any suitable coating technique, such as a vacuum depositing technique. The conductive layer may also be a homogeneous metal. Typical metals include aluminum, copper, gold, zirconium, niobium, tantalum, vanadium, hafnium, titanium, nickel, stainless steel, chromium, tungsten, molybdenum, and the like, and mixtures or alloys thereof.

The photoconductor 2 may be single- or dual-layered. When single-layered, the single layer performs both charge generation and charge transport functions. When dual-layered, one layer performs the charge generation function, and the other layer performs the charge transport function.

Any suitable charge generating (photogenerating) layer 2A may be applied to the substrate 1 or blocking layer 3. Examples of materials for photogenerating layers include inorganic photoconductive particles such as amorphous selenium, trigonal selenium, and selenium alloys selected from the group consisting of selenium-tellurium, selenium-tellurium-arsenic, selenium arsenide; and phthalocyanine pigment such as the X-form of metal-free phthalocyanine described in U.S. Pat. No. 3,357,989; metal phthalocyanines such as vanadyl phthalocyanine, copper phthalocyanine, titanyl phthalocyanine, aluminum phthalocyanine, haloindium phthalocyanine, magnesium phthalocyanine, zinc phthalocyanine and yttrium phthalocyanine; squarylium; quinacridones such as those available from du Pont under the trade names Monastral Red, Monastral Violet and Monastral Red Y; dibromoanthanthrone pigments such as those available under the trade names Hostaperm orange, Vat orange 1 and Vat orange 3; benzimidazole perylene; substituted 2,4-diamino-triazines disclosed in U.S. Pat. No. 3,442,781; polynuclear aromatic quinones such as those available from Allied Chemical Corporation under the trade names Indofast Double Scarlet, Indofast Violet Lake B, Indofast Brilliant Scarlet and Indofast Orange; benzofuranones; thiopyrrollopyrole; and the like, dispersed in a film forming polymeric binder. Multiphotogenerating layer compositions may be utilized where a photoconductive layer enhances or reduces the properties of the photo-generating layer. Examples of this type of configuration are described in U.S. Pat. No. 4,415,639. Other suitable photogenerating materials known in the art may also be utilized, if desired.

The photogenerating composition or pigment may be present in the resinous binder composition in various amounts. Preferably, the photogenerating material is present in the range of about 8 wt. % to about 50 wt. %, relative to the binder component.

The photogenerating layer 2A generally ranges in thickness from about 0.1 micrometer to about 5.0 micrometers, preferably from about 0.3 micrometer to about 3 micrometers. The photogenerating layer 2A thickness is related to binder content. Higher binder content compositions generally require thicker layers for photogeneration. Thicknesses outside these ranges can be selected, providing the objectives of the present invention are achieved.

Any suitable and conventional technique may be utilized to mix and thereafter apply the photogenerating layer 2A coating mixture to the previously dried substrate 1 or blocking layer 3. Typical application techniques include spraying, dip coating, roll coating, wire wound rod coating, and the like. Drying of the deposited coating may be effected by any suitable conventional technique such as oven drying, infrared radiation drying, air drying and the like, to remove substantially all of the solvents utilized in applying the coating.

The charge transport layer 2B may comprise any suitable transparent organic polymer or non-polymeric material capable of supporting the injection of photogenerated holes or electrons from the charge generating layer 2A and allowing the transport of these holes or electrons through the organic layer to selectively discharge the surface charge. The charge transport layer 2B not only serves to transport holes or electrons, but also protects the photoconductive layer 2A from abrasion or chemical attack, and therefore extends the operating life of the OPC. The charge transport layer 2B should exhibit negligible, if any, discharge when exposed to a wavelength of light useful in xerography, e.g. 400 nm–900 nm. The charge transport layer 2B is normally transparent in a wavelength region in which the photoconductor is to be used when exposure is effected therethrough to ensure that most of the incident radiation is utilized by the underlying charge generating layer 2A. When used with a transparent substrate, imagewise exposure or erasure may be accomplished through the substrate with all light passing through the substrate. In this case, the charge transport material 2B need not transmit light in the wavelength region of use. The charge transport layer 2B in conjunction with the charge-generating layer 2A is an insulator to the extent that an electrostatic charge placed on the top of the charge transport layer 2B is not conducted in the absence of illumination.

The charge transport layer 2B may comprise activating compounds or charge transport molecules dispersed in normally electrically inactive film-forming polymeric materials for making these materials electrically active. These charge transport molecules may be added to polymeric materials which are incapable of supporting the injection of photogenerated holes and incapable of allowing the transport of these holes. An especially preferred transport layer employed in multilayer photoconductors comprises from about 25 percent to about 75 percent by weight of at least one charge-transporting aromatic amine, and about 75 percent to about 25 percent by weight of a polymeric film-forming resin in which the aromatic amine is soluble.

For conventional OPC's, any suitable inactive resin binder soluble in methylene chloride or other suitable solvents may be employed. Typical inactive resin binders soluble in methylene chloride include polycarbonate resin, polyvinylcarbazole, polyester, polyarylate, polyacrylate, polyether, polysulfone, and the like. Molecular weights can vary from about 20,000 to about 1,500,000. Other solvents that may dissolve these binders include tetrahydrofuran, toluene, trichloroethylene, 1,1,2-trichloroethane, 1,1,1-trichloroethane, and the like.

The thickness of the charge transport layer may generally range from about 10 μm to about 50 μm, and preferably from about 20 μm to about 35 μm. Optimum thicknesses may range from about 23 μm to about 31 μm.

For the OPC's of this invention, the binder resin of the charge generation layer 2B must be self-cross-linked polyvinyl butyral (PVB). The other layers may also contain self-cross-linked PVB.

PVB has the following formula:

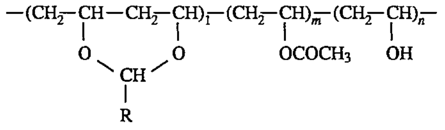

where R=alkyl, allyl, aryl, with or without the conventional functional substitute groups where l=50–95 mol % m=0.5–15 mol %, and n=5–35 mol %.

The PVB cross-linking is effected simply by heating it to between about 150°–300° C. The baking time is dependent upon the thickness and the binder content and can be varied from several minutes to several hours. I think other ways of cross-linking, for example, e-beam, UV or X-ray radiation, will also achieve results similar to those I obtained with heat. I think the cross-linking reaction is due to the —OH groups and the —O— groups from different locations on the same PVB polymer chain, or from different PVB chains, interacting to form bridge bonds.

On top of the electrically conductive substrate 1, the blocking layer 3 may be applied thereto. Electron blocking layers 3 for positively charged OPC's allow holes from the imaging surface of the photoreceptor to migrate toward the conductive layer. For negatively charged OPC's, any suitable hole blocking layer capable of forming a barrier to prevent hole injection from the conductive layer to the opposite photoconductive layer may be utilized. The thickness of the blocking layer may range from about 20 Angstroms to about 4000 Angstroms, and preferably ranges from about 150 Angstroms to about 2000 Angstroms.

The optional overcoating layers, charge injection barrier layer 4 and release layer 5, may comprise organic polymers or inorganic polymers that are electrically insulating or slightly semi-conductive. These overcoating layers may range in thickness from about 2 μm to about 8 μm and preferably from about 3 μm to about 6 μm. An optimum range of thickness is from about 3 μm to about 5 μm.

Cross-Linking Testing Procedure

The amount of cross-linking reaction was studied indirectly. In my tests I first weighed a sample of OPC ($M_1$) and then submerged the samples in a bath of dichloromethane solvent. Then, the sample was left to sit in the bath for several hours, after which time it was dried at 80° C. for about 1 hour. Then I weighed it again ($M_2$) and determined the difference ($M_1$–$M_2$). The expression, ($M_1$–$M_2$)/$M_1$ describes the % cross-linking, presuming the sample portion lost has been dissolved in the solvent and not protected by cross-linking.

Some cross-linking test results for PVB are illustrated in Table 1.

TABLE 1

| Sample # | Curing temp., °C. | Cross-linking, % |
|---|---|---|
| 2 | 110 | 0 |
| 2 | 200 | 80 |

From Table 1, it is apparent Sample 2 was 80% self-cross-linked after curing at 200° C.

OPC Testing Procedure a) Laser response: The well grounded OPC sample was wrapped around an Al drum having 180 mm diameter. The drum was rotated with the speed set at 3 inches per second. The OPC was charged, first, by corona charge at the starting position (0 degrees), and then exposed to 780 nm laser (2 mW output at 20 degrees). The electrostatic probe (Trek, Model 362) which was placed at the position 30 degrees detects the surface potential of the OPC exposed (Ve) and non-exposed (Vo) to the laser scan. The Vo value (volts) is equivalent to the charge acceptance and the Ve value is equivalent to the laser response.

b) Life test: The OPC sample was exposed to the repeated cycle: charge, laser expose, LED erase with the same conditions above mentioned. The changing of the Vo and Ve with cycles will give the information of the OPC life. Vo(1)=Vo of the first cycle, Vo(1000)=Vo at the 1000th cycle.

c) Thermal stability test: Tests a and b were carried out under the heating condition by incorporating the heater inside of the A1 drum. The set temperature is controlled by thermo-couple and temperature controller.

EXAMPLES

Example 1

Study the Laser Response and Dark Decay Effect of Cross-linking 16 g of x-$H_2$Pc, 84 g of polyvinyl butyral (Aldrich Chemical), 900 g of dichloromethane were milled together using steel stainless beads (4 mm) and a ball miller for 24 hours. The suspension was coated on A1/Mylar substrate using a doctor blade and dried at room temperature for 4 hrs. The OPC sample was divided into many pieces of identical OPC. These OPC's were baked in the oven at different temperatures and for different times. The baked OPC specimen, then, were applied to the a, b and c tests above described. The results are illustrated in Table 2.

TABLE 2

| Baking Temp (°C.) | Baking time (hrs.) | Vo (V) | Ve (V) | Dark Decay (V/s) | X-linking (%) |
|---|---|---|---|---|---|
| 80 C. | 2 | 550 | 480 | 3.0 | 0% |
| 150 C. | 2 | 560 | 420 | 2.8 | <10% |
| 175 C. | 2 | 553 | 250 | 2.7 | 30% |
| 200 C. | 2 | 540 | 100 | 2.6 | 80% |
| 225 C. | 1 | 560 | 120 | 2.7 | 50% |
| 175 C. | 4 | 543 | 80 | 2.8 | 90% |

TABLE 2-continued

| Baking Temp (°C.) | Baking time (hrs.) | Vo (V) | Ve (V) | Dark Decay (V/s) | X-linking (%) |
|---|---|---|---|---|---|
| 250 C. | 30 min. | 545 | 50 | 2.2 | 95% |

It is obvious from these results that the more highly cross-linked samples give rise to better laser response and lower dark decay than the less cross-linked samples.

Example 2

Study the Life Test Effect of Cross-linking

Some of the OPC samples described in Example 1 above were exposed to 1000 cycles life test. The results are illustrated in Table 3.

TABLE 3

| Baking temp (°C.) | Baking time (hrs) | Vo (1000)/ Vo (1) | X-linking (%) |
|---|---|---|---|
| 80 C. | 2 | 0.15 | 0% |
| 200 C. | 2 | 0.76 | 80% |
| 250 C. | 30 min. | 0.88 | 95% |

This table shows that the cross-linked samples exhibit better electrical stability than the non-cross-linked sample.

Example 3

Study the Baking Time at High Baking Temperature Effect on Cross-linking

Repeat the OPC formulations described in Example 1, except that the OPC samples were baked at 225° C. and 250° C. with different baking times. These OPC samples were tested with laser response test a), and life test b) at room temperature and at 55° C. In this case, the electrical stability of the sample is defined by the ratio:

D V (R.T.)=Vo(1000)/Vo(1) measured at room temperature (R.T.), and

D V (55)=Vo(1000)/Vo(1) measured at 55° C. by heating up the sample.

The results are illustrated in Table 4.

TABLE 4

Effect of Baking Time

| Baking temp (°C.) | Baking time | Vo (V) (RT) | Vo (V) (55) | Ve (V) (RT) | DV (RT) | DV (55) |
|---|---|---|---|---|---|---|
| 80 C. | 2 hrs. | 550 | 350 | 480 | 0.15 | 0.05 |
| 225 C. | 10 min. | 545 | 500 | 250 | 0.50 | 0.30 |
| 225 C. | 15 min. | 550 | 525 | 180 | 0.60 | 0.55 |
| 225 C. | 30 min. | 550 | 540 | 150 | 0.7 | 0.68 |
| 250 C. | 15 min. | 545 | 540 | 78 | 0.8 | 0.78 |
| 250 C. | 2 hrs. | 525 | 400 | 25 | 0.65 | 0.45 |

It should be noted that from these results changing in baking time may result in changing the hydroxy content in the OPC sample. The sample baked at 80° C., 2 hrs. shows poor laser response and poor thermal stability, that is, poor life. The samples baked at 225° C., 250° C. from 10 min. to 30 min. show the improved laser response, improved life and thermal stability. It may be due to the fact that the samples were partially cross-linked, especially in the surface. What that means is the surface may contain less or no hydroxy (—OH) compared to the bulk of the OPC. The sample baked at 250° C. for 2 hrs. may not contain hydroxy at all. It results that this particular baking condition shows very good laser response but poorer thermal stability and life due to the lack of hydroxy in the bulk of the OPC.

Example 4

Preparation of Dual Layer OPC with Cross-linked Charge Generation Layer 5 g of x-$H_2$Pc, 5 g of polyvinyl butyral (PVB) and 190 g dichloromethane were milled together using ball milling with steel stainless beads for 48 hrs. The suspension was coated on Al Mylar using a doctor blade to achieve a thickness of 0.5 μm after being dried at 80° C. for 20 minutes. The OPC specimen was divided into two identical pieces of OPC. One piece of the OPC was additionally baked at 200° C. for 2 hrs. to insure the cross-linking effect, tested by detecting the insolubility of the layer.

Then, 400 g of p-tolylamine and 600 g of polycarbonate (Makralon™) were dissolved together in 5600 g of dichloromethane. The resulting solution was dip-coated on top of the charge generating films prepared above, and dried at 135° C. for 20 minutes to make charge transport films of about 18 μm thickness on top of the charge generating film.

The laser xerographic performance of these two samples is illustrated in Table 5.

TABLE 5

| Sample | Vo (1000)/Vo (1) | Speed (1000)/Speed (1) |
|---|---|---|
| (1) X-linked | 0.99 | 0.99 |
| (2) Non X-linked | 0.82 | 0.84 |

From this result, it is recognized that the cross-linked CGL sample exhibits the improved stability. It should be noted that the samples were charged with negative corona charger.

Example 5

Adhesion Test

The Samples 1 and 2 above were also subjected to a pull type adhesion test. In this test, a piece of strong adhesive tape was fastened to the top surface of the charge transporting film and pulled vertically upward until the charge transporting film was separated and pulled away 1 cm from the charge generating film. The force required to effect this separation was measured, and some results are reported in Table 6.

TABLE 6

| Sample | Separation Force, dyne/cm |
|---|---|
| 1 | 15 |
| 2 | 200 |

These results indicate the self-cross-linked Sample 2 has much more adhesion, more than 13 times as much, as the non-cross-linked Sample 1.

Example 6

IR Spectrum

FIGS. 5 and 6 illustrate the Ft-IR spectrum of two different kinds of Polyvinyl Butyral, Butvar™, B-76 and B-98 (Monsanto Chemical), respectively, baked at different temperatures.

It is observed from these results that the cross-linked PVB was formed along with the reduction of —OH group detected at the Wave number of 3500 ($cm^{-1}$) in both cases.

While there is shown and described the present preferred embodiment of the invention, it is to be distinctly understood that this invention is not limited thereto but may be variously embodied to practice within the scope of the following claims.

What is claimed is:

1. An organic photoconductor for electrophotography comprising:

a conductive substrate; and a photoconductive layer greater than or equal to about 1 micron thick above said conductive substrate, said photoconductive layer having a binder component comprising self-cross-linked polyvinyl butyral made by reacting polyvinyl butyral molecules in the absence of a cross-linker, in the absence of a cross-linkable copolymer, and in the absence of a cross-linking catalyst, so that said binder component after said reacting is free of cross-linking catalyst, and said photoconductive layer having a photoconductive particle component uniformly distributed throughout said binder component.

2. The photoconductor of claim 1 wherein the binder component is self-cross-linked by exposure to heat at between about 150°–300° C.

3. The photoconductor of claim 1 which also comprises a polymeric component forming a charge blocking layer on said conductive substrate.

4. The photoconductor of claim 1 which also comprises a polymeric component forming a charge injection barrier layer above said photoconductive layer.

5. The photoconductor of claim 1 which also comprises a polymeric component forming a release layer above said photoconductive layer.

* * * * *